United States Patent
Yokoyama et al.

(10) Patent No.: US 7,255,401 B2
(45) Date of Patent: Aug. 14, 2007

(54) AUTOMOBILE HEADREST

(75) Inventors: Hiroshi Yokoyama, Ojima-machi (JP); Satoshi Katahira, Yokohama (JP)

(73) Assignee: NHK Spring Co, Ltd. (JP)

( * ) Notice: Subject to any disclaimer, the term of this patent is extended or adjusted under 35 U.S.C. 154(b) by 150 days.

(21) Appl. No.: 11/079,645

(22) Filed: Mar. 14, 2005

(65) Prior Publication Data

US 2005/0200185 A1   Sep. 15, 2005

(30) Foreign Application Priority Data

Mar. 15, 2004 (JP) .............................. 2004-072832

(51) Int. Cl.
*A47C 7/38* (2006.01)
(52) U.S. Cl. ..................................... 297/410
(58) Field of Classification Search ................. 297/410
See application file for complete search history.

(56) References Cited

U.S. PATENT DOCUMENTS

| | | | | |
|---|---|---|---|---|
| 4,976,493 A | * | 12/1990 | Frankila | 297/410 |
| 5,156,440 A | * | 10/1992 | Vidwans | 297/410 |
| 5,895,094 A | * | 4/1999 | Mori et al. | 297/410 |
| 5,934,755 A | * | 8/1999 | Halamish | 297/410 |
| 6,062,645 A | * | 5/2000 | Russell | 297/410 |
| 6,543,852 B2 | * | 4/2003 | Mori | 297/410 |
| 6,631,956 B2 | * | 10/2003 | Mauro et al. | 297/410 |
| 6,655,742 B1 | * | 12/2003 | Ozaki | 297/410 |
| 2003/0222492 A1 | * | 12/2003 | Nemoto et al. | 297/410 |
| 2004/0145228 A1 | * | 7/2004 | Terrand et al. | 297/410 |
| 2005/0280305 A1 | * | 12/2005 | Gurtatowski et al. | 297/410 |

FOREIGN PATENT DOCUMENTS

| | | |
|---|---|---|
| JP | 4-193109 | 7/1992 |
| JP | 2003-259935 | 9/2003 |

* cited by examiner

*Primary Examiner*—Rodney B. White
(74) *Attorney, Agent, or Firm*—McGlew and Tuttle P.C.

(57) ABSTRACT

A headrest stay for supporting a headrest is inserted in a headrest bush and is supported. A height adjusting mechanism is attached to the headrest bush at a position corresponding to an upper end portion of a seat back. A headrest removal prevention device for preventing the headrest from being removed is built in the headrest bush at a position inside the seat back. The height adjusting mechanism and the headrest removal prevention device are formed of the same component.

4 Claims, 10 Drawing Sheets

AUTOMOBILE HEADREST

CROSS REFERENCE TO RELATED APPLICATIONS

This application claims the benefit of priority under 35 U.S.C. § 119 of JP 2004-072832 filed Mar. 15, 2004, the entire contents of which are incorporated herein by reference.

FIELD OF THE INVENTION

The present invention relates to an automobile headrest, and more particularly, to an automobile headrest having a height adjusting mechanism and a falloff preventing device that prevents the headrest from falling off from a seat back unexpectedly.

BACKGROUND OF THE INVENTION

It has been a common practice to mount a headrest to an automobile seat for the purpose of promoting safety and protecting a passenger in case of an accident such as a collision. To be adjustable to an arbitrary vertical position according to a physical constitution or preference of the passenger, the headrest is provided with a height adjusting mechanism. In general, two headrest stays are firmly fixed to the headrest and supported by being inserted respectively in two headrest bushes that are securely installed on the side of a seat back, and while one of the headrest bushes is provided with the height adjusting mechanism, the other headrest bush is free.

In the case of a collision (including a rear-end collision), the automobile headrest prevents the head of a passenger in the seat from being tilted backwards too much due to an impact of the collision. At this moment, an impact force applied to the head of the passenger acts as a load pressing the headrest downwards. Therefore, the height adjusting mechanism of the automobile headrest allows the headrest to move upwards upon application of an extracting force thereto and to stop at an arbitrary height, and locks the headrest to prohibit it from moving downwards unless an unlocking operation is performed (e.g., see JP-HE1 4-193109 A).

More specifically, headrest stays of the headrest are vertically adjustably inserted and supported in headrest bushes that are securely installed on the side of a seat back. Lock members reciprocating due to a resilient force are attached to the headrest bushes at a position corresponding to an upper end portion of the seat back and abut on the headrest stays respectively. The headrest stays have a plurality of height adjusting notches arranged at a predetermined spacings. The headrest is held at a predetermined height through engagement of the lock members with the notches. In this state, the height adjusting notches are so shaped as to allow the headrest stays to move upwards in relation to the lock members but to prohibit the headrest stays from moving downwards.

FIG. 9 is a partially broken exploded perspective view of an example thereof. FIG. 10 is a cross-sectional perspective view of a main part according to the example. A headrest stay 3 of a headrest is inserted and supported in a tubular headrest bush 6, and a height adjusting mechanism 7 is attached to the headrest bush 6 at a position corresponding to an upper end portion of a seat back. In the height adjusting mechanism 7, a lock plate (lock member) 8 is attached to the headrest bush 6 so as to be free to reciprocate perpendicularly to the headrest stay 3, which penetrates the lock plate 8. A portion 8a of the lock plate 8 is pressed against the penetrating headrest stay 3 due to a resilient force of a spring 12. In practice, the lock plate 8 and the spring 12 are accommodated in a case 13, and only an operating portion 8b of the lock plate 8 protrudes outside. The headrest stay 3 has a plurality of height adjusting notches 4 that are arranged at a predetermined spacings. The lock plate 8 engages one of the notches 4 due to the resilient force of a spring 12, whereby the headrest stay 3 is locked. As shown in FIGS. 9 and 10, each of the height adjusting notches 4 is formed of a horizontal face 4a that extends toward the center of the headrest stay 3 and an inclined face 4b that extends downwards from the deepest portion of the horizontal face 4a while gradually increasing in distance from the center of the headrest stay 3.

In this construction, when the headrest is pulled (drawn out) upwards, the portion 8a of the lock plate 8 abutting on the headrest stay 3 is released from the notch 4 against the resilient force (spring force) of the spring 12 owing to an operation of the inclined face 4b of the notch 4. As a result, the headrest stay 3 can move upwards and the height of the headrest can be adjusted. On the contrary, when the headrest is pressed downwards, the lock plate 8 remains engaged with the horizontal face 4a of the notch 4 without being released therefrom. Therefore, the headrest stay 3 is allowed to move downwards by pressing the operating portion 8b of the lock plate 8 against the spring 12 and releasing the lock plate 8 from the notch 4. Consequently, the downward movement of the headrest can be adjusted.

As is apparent from the foregoing construction, the headrest equipped with the conventional height adjusting mechanism as described above can be easily drawn out from the seat. Therefore, the headrest may be drawn out inadvertently or on purpose, which raises a problem in that the safety of a passenger cannot be guaranteed in case of an accident such as a collision.

Thus, a headrest provided with a headrest removal prevention mechanism is disclosed as a solution to the problem (e.g., see JP-2003-259935 A).

The conventional headrest removal prevention mechanism can prevent the headrest from falling off. However, there is a problem in that the headrest cannot be drawn out from the seat. In practice, however, it is often necessary to draw the headrest out from the seat for cleaning, maintenance, and the like.

SUMMARY OF THE INVENTION

In view of the above-mentioned problem, it is a first object of the present invention to provide an automobile headrest which can be prevented from being drawn out inadvertently or on purpose, and can be drawn out through a special operation if necessary.

Further, it is advantageous in terms of cost to utilize the same components for the headrest height adjusting mechanism and the headrest removal prevention mechanism (device). Therefore, it is a second object of the present invention to provide an automobile headrest allowing the same components to be used for a headrest height adjusting mechanism and a headrest removal prevention mechanism (device).

To attain the above objects, according to the present invention, there is provided an automobile headrest including: a first headrest stay and a second headrest stay that support the headrest; a first headrest bush and a second headrest bush in which the first headrest stay and the second headrest stay are inserted and supported respectively; a height adjusting mechanism that is attached to the first headrest bush at a position corresponding to an upper end portion of a seat back; and a headrest removal prevention device that is built in the second headrest bush at a position inside the seat back and includes a locking mechanism for preventing the headrest from falling off and an unlocking mechanism for unlocking the headrest, characterized in that: the second headrest stay is provided with a falloff preventing notch; the second headrest bush is provided with a lock member capable of reciprocating and adapted to abut on the inserted second headrest stay due to a resilient force of a spring; the locking mechanism prevents the headrest from falling off through engagement of the lock member with the falloff preventing notch of the second headrest stay; and the unlocking mechanism disengages the lock member from the falloff preventing notch through an operation of the lock member against the resilient force of the spring.

Thus, the falloff preventing device prevents the headrest (the second headrest stay) from falling off. Therefore, the headrest is always available and the safety of a passenger is guaranteed in case of a collision or the like. In drawing out the headrest, the falloff preventing device must unlock the headrest to allow it to be drawn out. However, since the falloff preventing device is installed inside the seat back, the headrest cannot be easily unlocked. It is therefore possible to prevent the headrest from being easily or deliberately drawn out from the seat back. However, when it is necessary to draw the headrest out from the seat for reasons of cleaning, maintenance, and the like, the headrest can be removed from the seat by partially disassembling the seat and unlocking the locking mechanism of the falloff preventing device inside the seat back. Further, since the height adjusting mechanism is provided at the position corresponding to the upper end portion of the seat back, the headrest can be easily adjusted in height and unlocked.

Even if the headrest has been moved to be drawn out, the lock member engages the falloff preventing notch of the second headrest stay and is locked as soon as the notch reaches the position of the lock member. Consequently, the headrest is prevented from falling off. The lock member is unlocked through an operation of the lock member against a resilient force of the spring. Consequently, the headrest can be drawn out.

Further, according to the present invention, there is provided an automobile headrest including: a first headrest stay and a second headrest stay that support the headrest; a first headrest bush and a second headrest bush in which the first headrest stay and the second headrest stay are inserted and supported respectively; a height adjusting mechanism that is attached to the first headrest bush at a position corresponding to an upper end portion of a seat back; and a headrest removal prevention device that is built in the second headrest bush at a position inside the seat back and includes a locking mechanism for preventing the headrest from falling off and an unlocking mechanism for unlocking the headrest, characterized in that: the first headrest stay is provided with a height adjusting notch; the second headrest stay is provided with a falloff preventing notch; the height adjusting mechanism is provided with a lock member capable of reciprocating and adapted to abut on the first headrest stay inserted in the first headrest bush due to a resilient force of a spring, and includes a locking mechanism for holding the headrest at a predetermined height through engagement of the lock member with the height adjusting notch of the first headrest stay and an unlocking mechanism for disengaging the lock member from the height adjusting notch through an operation of the lock member against the resilient force of the spring; the headrest removal prevention device is provided with a lock member capable of reciprocating and adapted to abut on the second headrest stay inserted in the second headrest bush due to a resilient force of a spring; the locking mechanism of the headrest removal prevention device prevents the headrest from falling off through engagement of the lock member with the falloff preventing notch of the second headrest stay; and the unlocking mechanism of the headrest removal prevention device disengages the lock member from the falloff preventing notch through an operation of the lock member against the resilient force of the spring.

Thus, in addition to the above-mentioned operation and effect, the height adjusting mechanism and the falloff preventing mechanism make it possible to employ the same components and adopt the same construction simply by changing the shapes of the notches to be formed in the headrest stays. Accordingly, the first headrest bush provided with the height adjusting mechanism can be turned upside down to be adopted as the falloff preventing device.

Further, according to the present invention, there is provided an automobile headrest including: a headrest stay that supports the headrest; a headrest bush into which the headrest stay is inserted to support the headrest; a height adjusting mechanism that is attached to the headrest bush at a position corresponding to an upper end portion of a seat back; and a headrest removal prevention device that is built in the headrest bush provided with the height adjusting mechanism at a position inside the seat back and includes a locking mechanism for preventing the headrest from falling off and an unlocking mechanism, characterized in that: the headrest stay is provided with a falloff preventing notch; the headrest bush is provided with a lock member capable of reciprocating and adapted to abut on the inserted headrest stay due to a resilient force of a spring; the locking mechanism of the headrest removal prevention device prevents the headrest from falling off through engagement of the lock member with the falloff preventing notch of the headrest stay; and the unlocking mechanism of the headrest removal prevention device disengages the lock member from the falloff preventing notch through an operation of the lock member against the resilient force of the spring.

Further, according to the present invention, there is provided an automobile headrest including: a headrest stay that supports the headrest; a headrest bush into which the headrest stay is inserted to support the headrest; a height adjusting mechanism that is attached to the headrest bush at a position corresponding to an upper end portion of a seat back; and a headrest removal prevention device that is built in the headrest bush provided with the height adjusting mechanism at a position inside the seat back and includes a locking mechanism for preventing the headrest from falling off and an unlocking mechanism, characterized in that: the height adjusting mechanism of the headrest has a height adjusting notch formed in the headrest stay; the headrest removal prevention device has a falloff preventing notch formed in the headrest stay; the height adjusting mechanism is provided with a lock member capable of reciprocating and adapted to abut on the headrest stay inserted in the headrest bush due to a resilient force of a spring, and includes a locking mechanism for holding the headrest at a predetermined height through engagement of the lock member with the height adjusting notch of the headrest stay and an unlocking mechanism for disengaging the lock member from the height adjusting notch through an operation of the lock member against the resilient force of the spring; the headrest removal prevention device is provided with a lock member capable of reciprocating and adapted to abut on the headrest stay inserted in the headrest bush due to a resilient force of the spring; the locking mechanism of the falloff preventing device prevents the headrest from falling off through engagement of the lock member with the falloff preventing notch of the headrest stay; and the unlocking mechanism of the falloff preventing device disengages the lock member from the falloff preventing notch through an operation of the lock member against the resilient force of the spring.

The automobile headrest of the present invention provides the following effects.

(1) Because the falloff preventing device prevents the headrest from falling off, the headrest is always available and the safety of a passenger is guaranteed.

(2) To make it possible to draw out the headrest, the falloff preventing device must unlock it. However, since the falloff preventing device is installed inside the seat back, the headrest cannot be easily unlocked. It is therefore possible to prevent the headrest from being easily or deliberately drawn out from the seat back. The safety of a passenger can thereby be guaranteed. However, when it is necessary to draw the headrest out from the seat for reasons of cleaning, maintenance, and the like, the headrest can be removed from the seat by partially disassembling the seat and unlocking the locking mechanism of the falloff preventing device inside the seat back.

(3) The falloff preventing device can be constructed of the same components as those of the height adjusting mechanism by simply changing the shapes of the notches to be formed in the headrest stays. Therefore, the number of parts can be reduced and the headrest can be offered at low prices.

(4) The height adjusting mechanism and the falloff preventing mechanism make it possible to employ the same components and adopt the same construction simply by changing the shapes of the notches to be formed in the headrest stays. Accordingly, the first headrest bush provided with the height adjusting mechanism can be turned upside down to be adopted as the falloff preventing device. Thus, the cost of the headrest can be reduced and the operation of mounting the headrest can be easily performed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
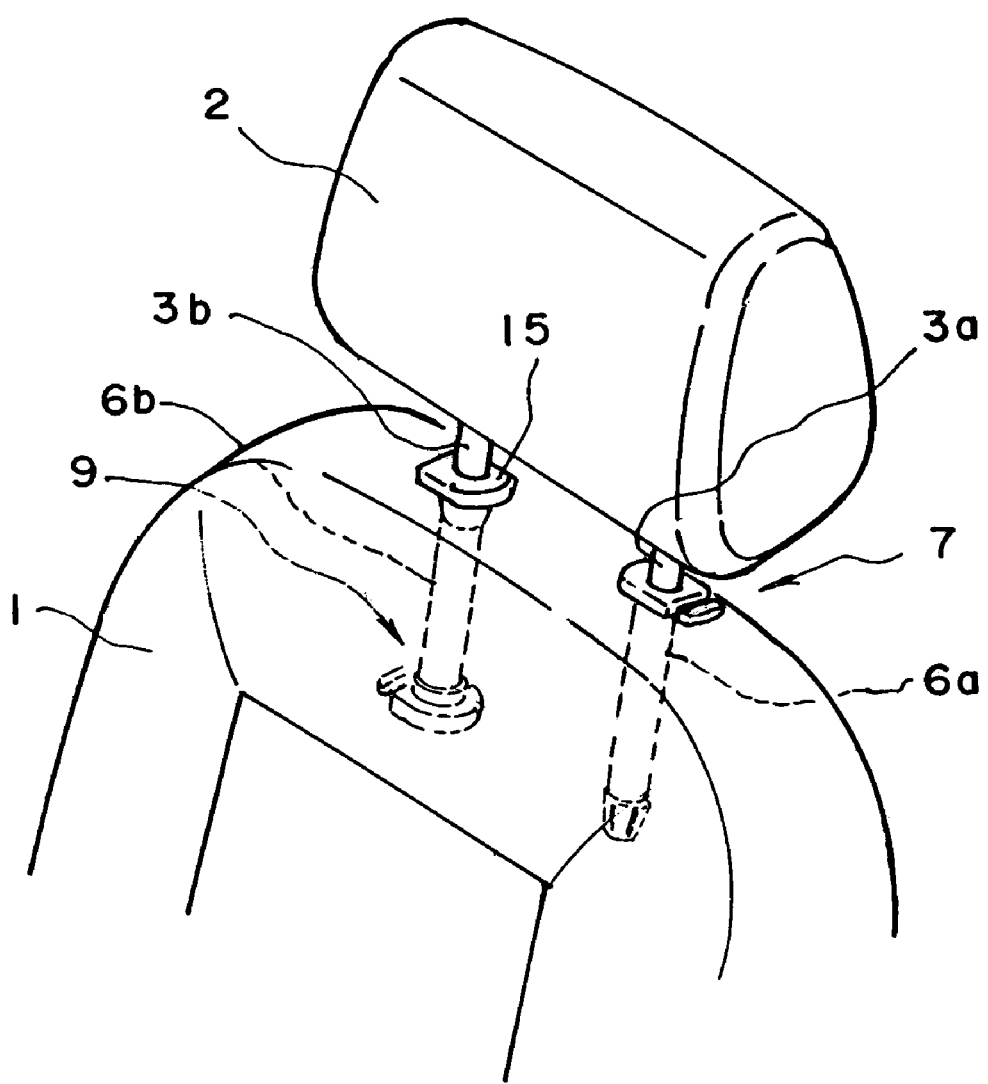
FIG. 1 is a perspective view showing a first embodiment of the present invention.
Figure 2:
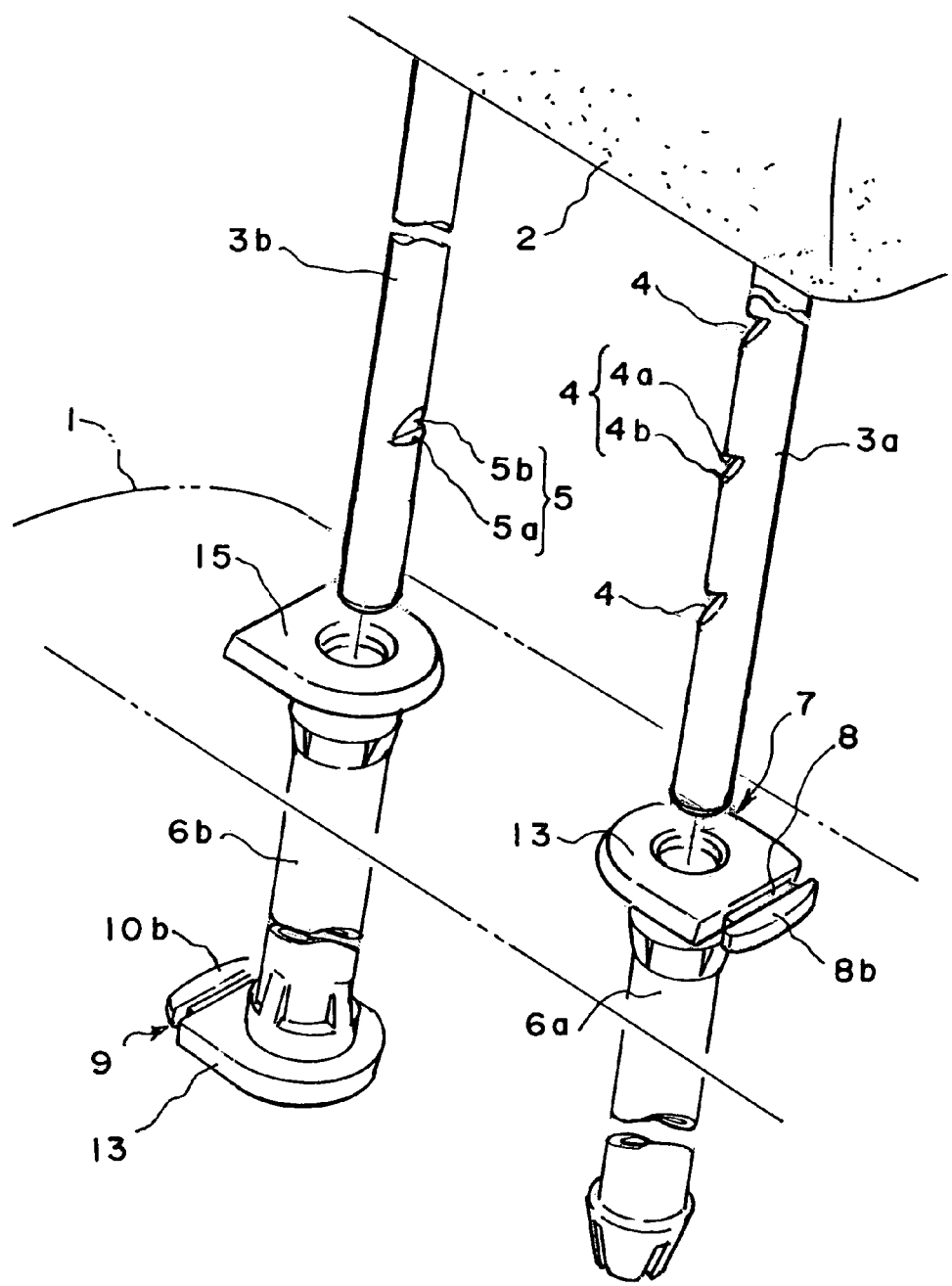
FIG. 2 is an exploded perspective view of a main part according to the first embodiment of the present invention.
Figure 3:
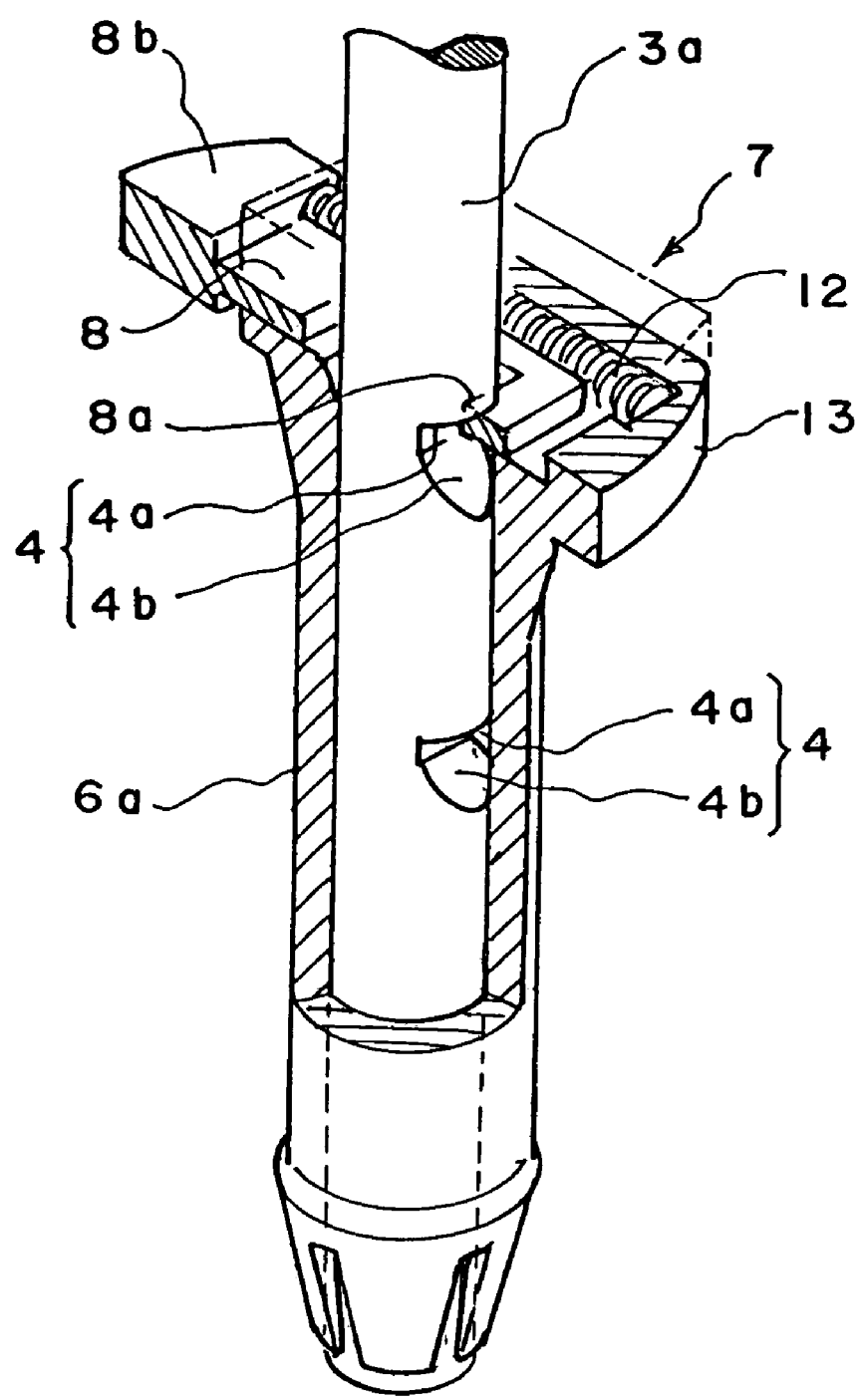
FIG. 3 is a partially broken perspective view of a height adjusting mechanism according to the first embodiment of the present invention.
Figure 4:
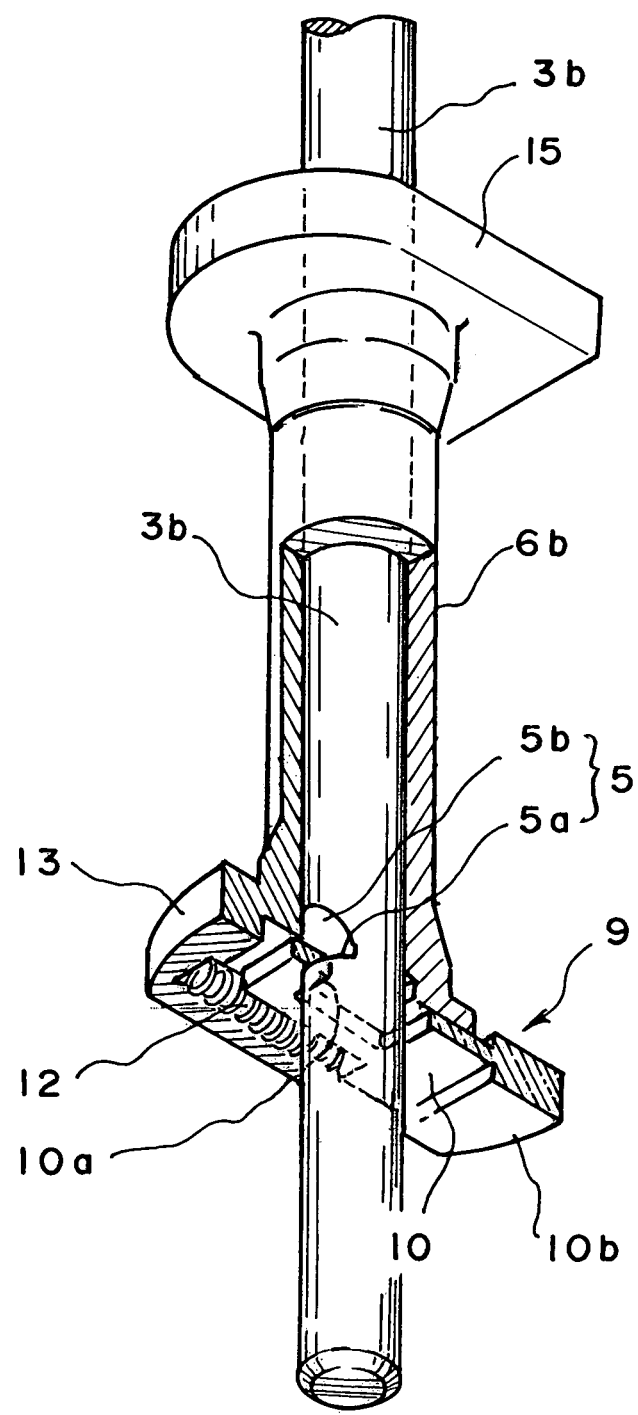
FIG. 4 is a partially broken perspective view of a falloff preventing device according to the first embodiment of the present invention as viewed from its bottom face side.
Figure 5:
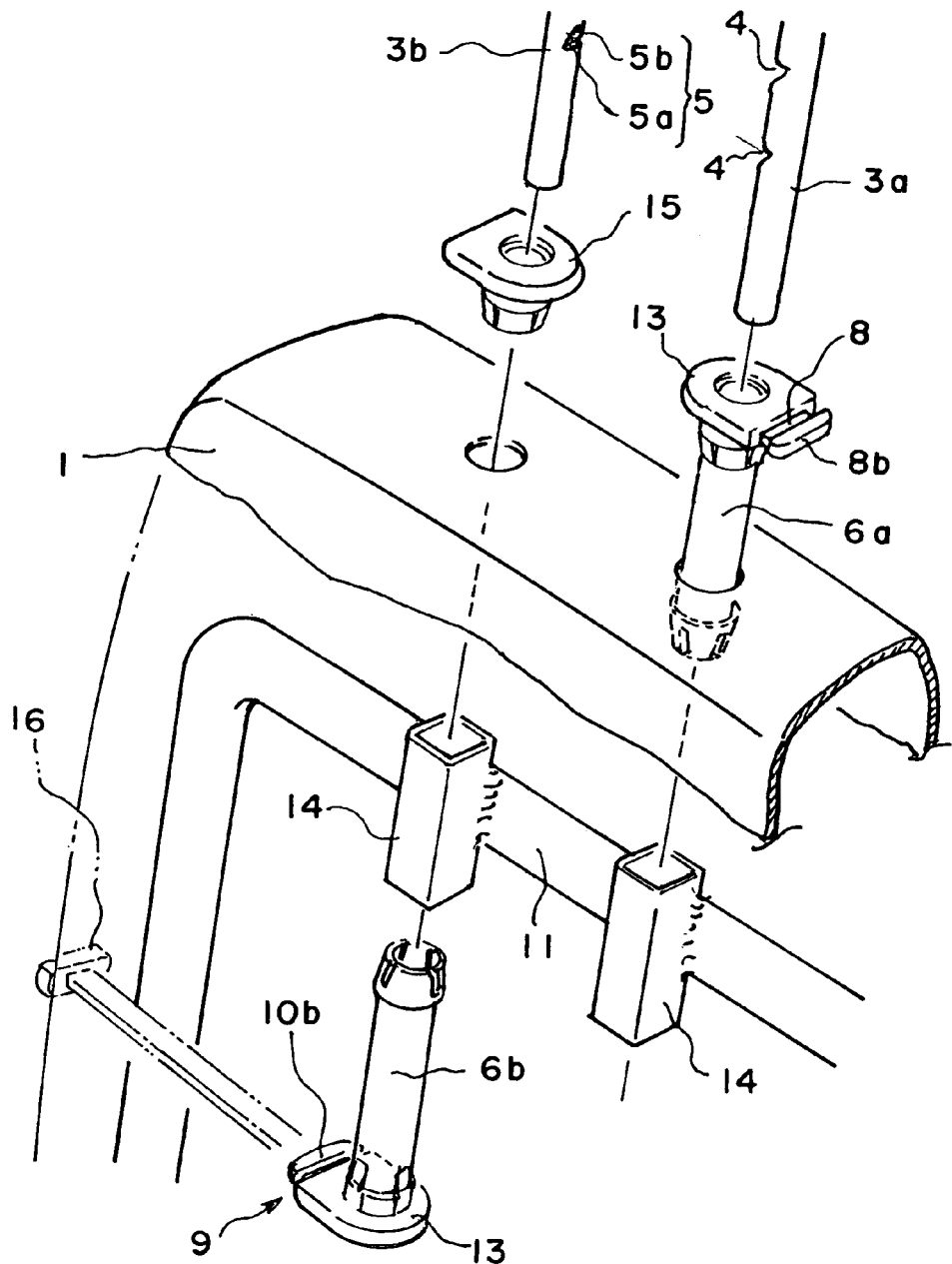
FIG. 5 is an exploded perspective view showing the first embodiment of the present invention.

Referring to the drawings in particular, FIG. 1 is a perspective view showing a first embodiment of the present invention. FIG. 2 is an exploded perspective view of a main part according to the first embodiment of the present invention. FIG. 3 is a partially broken perspective view of a height adjusting mechanism according to the first embodiment of the present invention. FIG. 4 is a partially broken perspective view of a falloff preventing device according to the first embodiment of the present invention as viewed from its bottom face side. FIG. 5 is an exploded perspective view showing the first embodiment of the present invention and illustrates a case where the present invention is applied to a front seat of an automobile. In the following description, the same components as in the conventional example shown in FIGS. 9 and 10 will be denoted by the same reference symbols as used above.

A headrest 2 is supported by inserting headrest stays 3a and 3b into tubular headrest bushes 6a and 6b respectively. The headrest stays 3a and 3b are attached to the headrest 2 to support it. The headrest bushes 6a and 6b are securely installed on the side of a seat back 1. The two headrest stays 3a and 3b are laterally arranged. As shown in FIG. 5, the headrest bushes 6a and 6b are fixed to a seat back frame 11 of the seat back 1. More specifically, the headrest bushes 6a and 6b are fixed by being inserted into tubular attachment members 14, which are firmly fixed to the seat back frame 11. While the headrest bush 6a is provided with a height adjusting mechanism 7, the headrest bush 6b is provided with a falloff preventing device 9. The height adjusting mechanism 7 can stop (hold) the headrest 2 (the headrest stay 3a) at an arbitrary height. The falloff preventing device 9 can prevent the headrest 2 (the headrest stay 3b) from falling off.

Figure 9:
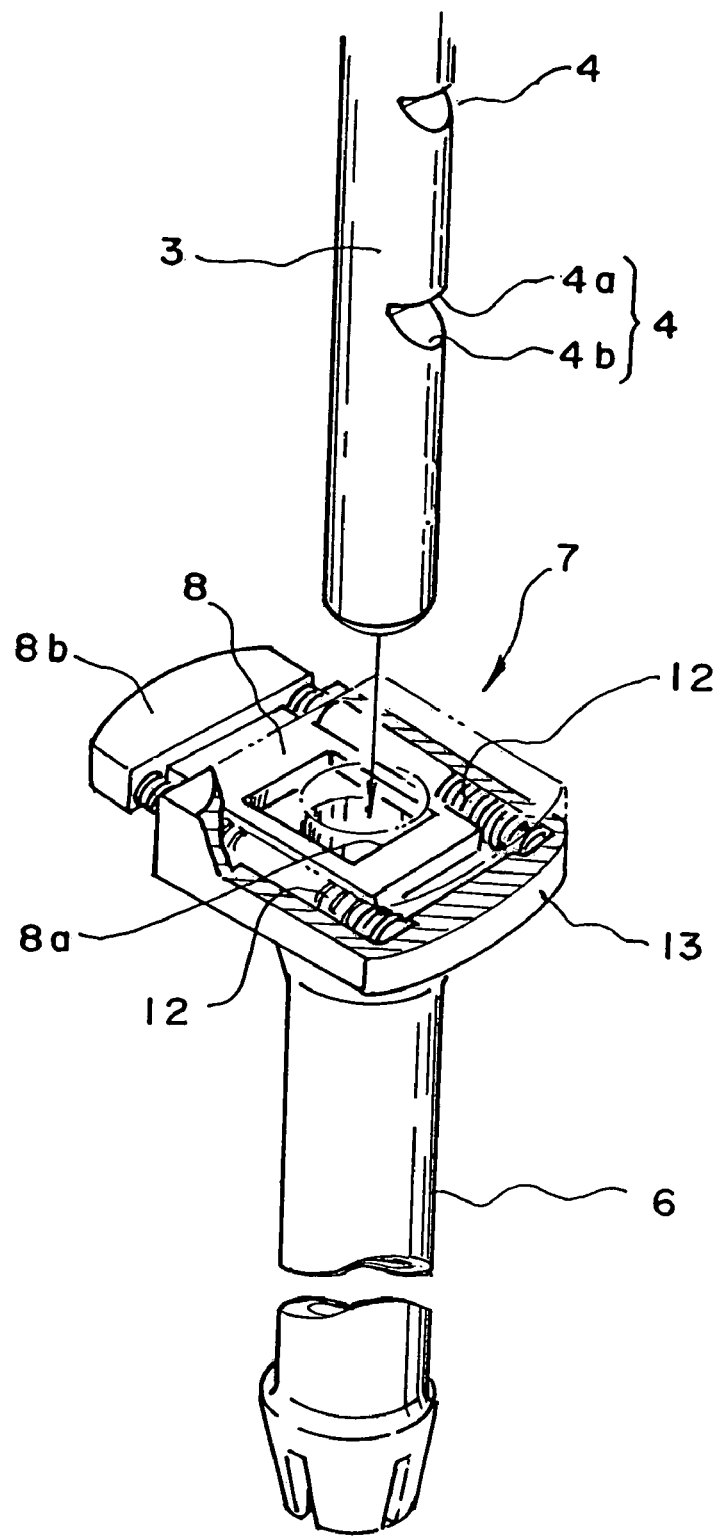
FIG. 9 is a partially broken exploded perspective view showing a conventional height adjusting mechanism.
Figure 10:
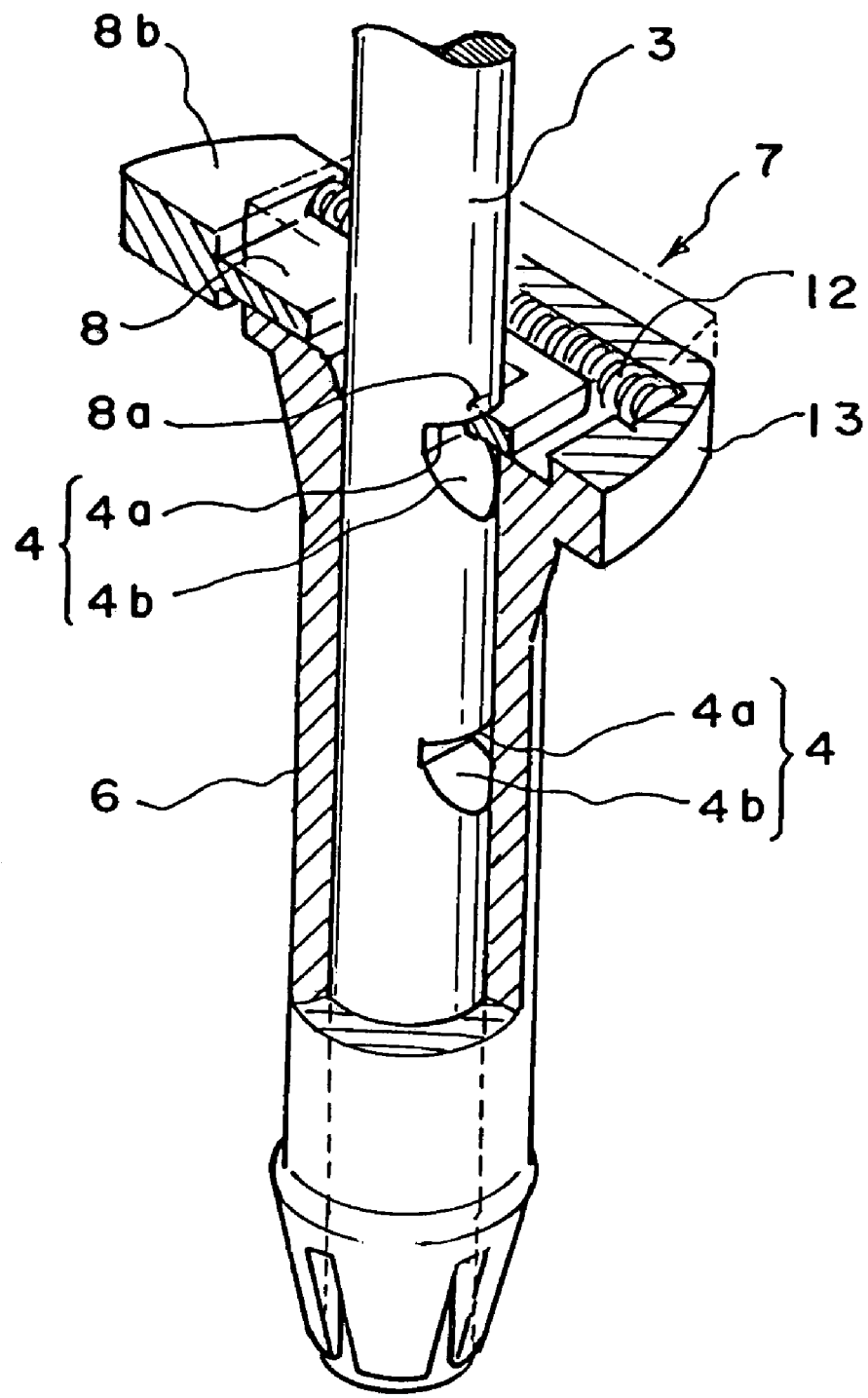
FIG. 10 is a cross-sectional perspective view of a main part of the conventional height adjusting mechanism.

The height adjusting mechanism 7 is mounted to the headrest bush 6a at a position corresponding to an upper end portion of the seat back 1, and is constructed in the same manner as in FIGS. 9 and 10. At the expense of repetition, the height adjusting mechanism 7 will be described with reference to FIG. 3.

In the height adjusting mechanism 7, as shown in FIG. 3, a lock plate 8 as a lock member is so attached to the headrest bush 6a as to be free to reciprocate perpendicularly to the headrest stay 3a, which penetrates the lock plate 8 to be inserted into the headrest bush 6a. In a region where the headrest stay 3a penetrates the lock plate 8, a gap formed between the headrest stay 3a and the lock plate 8 allows the lock plate 8 to move (reciprocate). A portion 8a of the lock plate 8 is pressed against the penetrating headrest stay 3a due to a resilient force of a spring 12. The lock plate 8 and the spring 12 are accommodated in a case 13, and only an operating portion 8b of the lock plate 8 protrudes outside. An unlocking operation can be performed by pressing the operating portion 8b. The headrest stay 3a has a plurality of height adjusting notches 4 that are arranged at intervals of a predetermined distance. Each of the height adjusting notches 4 is formed of a horizontal face 4a that extends toward the center of the headrest stay 3a and an inclined face 4b that extends downwards from the deepest portion of the horizontal face 4a while gradually increasing in distance from the center of the headrest stay 3a.

Accordingly, when the headrest 2 is pulled upwards (pulled outwards), the portion 8a of the lock plate 8 abutting on the headrest stay 3a is released from the height adjusting notch 4 against a resilient force (spring force) of the spring 12 owing to an operation of the inclined face 4b of the notch 4. As a result, the headrest stay 3a can move upwards and the height of the headrest 2 can be adjusted. In moving downwards, the headrest 2 stops at a corresponding position where the horizontal face 4a of the notch 4 is locked by being engaged with the lock plate 8. In contrast, when the headrest 2 is pressed downwards, the lock plate 8 remains engaged with the horizontal face 4a of the notch 4 without being released therefrom. Thus, the operating portion 8b of the lock plate 8 is pressed to unlock the headrest stay 3a. As a result, the headrest stay 3a can move downwards and the downward movement of the headrest 2 can be adjusted.

The falloff preventing device 9 is provided at a lower end of the headrest bush 6b, and is located inside the seat back 1 (inward of a seat facing). An upper end of the headrest bush 6b is located in an upper end portion of the seat back 1, and is provided with a case 15.

The falloff preventing device 9 is substantially identical in construction with the aforementioned height adjusting mechanism 7. However, the falloff preventing device 9 is different from the height adjusting mechanism 7 in that a falloff preventing notch 5 is formed in a lower portion of the inserted headrest stay 3b. In other words, as shown in FIG. 4, a lock plate 10 as a lock member is so attached to the headrest bush 6b as to be free to reciprocate perpendicularly to the headrest stay 3b, which penetrates the lock plate 10 to be inserted into the headrest bush 6b. In a region where the headrest stay 3b penetrates the lock plate 10, a gap formed between the headrest stay 3b and the lock plate 10 allows the lock plate 10 to move (reciprocate). A portion 10a of the lock plate 10 is pressed against the penetrating headrest stay 3b due to a resilient force of the spring 12. The lock plate 10 and the spring 12 are accommodated in the case 13, and only an operating portion 10b of the lock plate 10 protrudes outside. An unlocking operation can be performed by pressing the operating portion 10b. The falloff preventing notch 5 is formed in the lower portion of the headrest stay 3b. The falloff preventing notch 5 is formed of a horizontal face 5a that extends toward the center of the headrest stay 3b and an inclined face 5b that extends upwards from the deepest portion of the horizontal face 5a while gradually increasing in distance from the center of the headrest stay 3b.

Accordingly, the headrest stay 3b is free to move vertically. However, when the headrest stay 3b moves upwards and the falloff preventing notch 5 reaches a position of the lock plate 10, the lock plate 10 is locked by being engaged with the horizontal face 5a of the notch 5. As a result, the headrest stay 3b is prevented from moving upwards. Therefore, the headrest stay 3b cannot move any further upwards and the headrest 2 is prevented from falling off. To move the headrest stay 3b further upwards and remove it, it is unlocked by pressing the operating portion 10b of the lock plate 10.

In the regions where the headrest stays 3a and 3b penetrate the lock plates 8 and 10 respectively, the gaps are formed between the headrest stays 3a and 3b and the lock plates 8 and 10, respectively, to allow the lock plates 8 and 10 to move (reciprocate). This is intended to press and move the lock plates 8 and 10 and disengage (unlock) them from the notches 4 and 5 respectively. Therefore, the gaps 8 and 10 are set to widths required for releasing the lock plates 8 and 10 from the notches 4 and 5 respectively.

In the height adjusting mechanism 7, therefore, when the headrest 2 is pulled upwards (pulled outwards), the portion 8a of the lock plate 8 abutting on the headrest stay 3a is released from the notch 4 against the resilient force (spring force) of the spring 12 owing to an operation of the inclined face 4b of the notch 4. As a result, the headrest stay 3a can move upwards and the height of the headrest 2 can be adjusted. On the contrary, when the headrest 2 is pressed downwards, the lock plate 8 remains engaged with the horizontal face 4a of the notch 4 without being released therefrom. Therefore, the headrest stay 3a is allowed to move downwards by pressing the operating portion 8b of the lock plate 8 against the spring 12 and releasing the lock plate 8 from the notch 4. Consequently, the downward movement of the headrest 2 can be adjusted. In this manner, the height adjusting mechanism 7 of the present invention makes it possible to adjust the height of the headrest 2 by pulling the headrest 2 upwards, and to press the headrest 2 downwards by unlocking the lock plate 8 by pressing the operating portion 8b. The operating portion 8b is located in the upper end portion of the seat back 1 and thus can be easily operated.

In the falloff preventing device 9, even when the headrest 2 moves upwards, the lock plate 10 is engaged with the falloff preventing notch 5 of the headrest stay 3b and locked by the horizontal face 5a when the notch 5 reaches the lock plate 10. Thus, the headrest 2 cannot be pulled any further upwards and is prevented from falling off. The headrest 2 can be pulled upwards and drawn out by pressing the operating portion 10b of the lock plate 10 to unlock the headrest stay 3b. In the present invention, therefore, the headrest 2 cannot be drawn out from the seat back 1 unless the operating portion 10b of the falloff preventing device 9 is pressed to unlock the headrest stay 3b. Because the falloff preventing device 9 is provided inside the seat back 1, the headrest stay 3b cannot be easily unlocked. Therefore, the headrest 2 can be prevented from being removed (separated) from the seat back 1 easily or deliberately. However, when it is necessary to remove (separate) the headrest 2 from the seat back 1 for reasons of cleaning, maintenance, and the like, the headrest stay 3b can be unlocked by disassembling part of the seat, for example, removing a backside board of the seat or disengaging a hook or hog ring for stopping a backside facing material and pressing the operating portion 10b of the falloff preventing device 9 inside the seat back 1, and then the headrest 2 can be separated (removed) from the seat back 1. Besides, since the height adjusting mechanism 7 and the falloff preventing device 9 are different only in the shapes of the notches 4 and 5 and identical in other constructional details, the same components can be used.

In this embodiment, it is preferable that the position where the headrest stay 3b of the headrest 2 moves upwards and is locked when the falloff preventing notch 5 reaches the lock plate 10 be coincident with the position where the lock plate 8 is locked in the lowermost one of the height adjusting notches 4 of the headrest stay 3a in the height adjusting mechanism 7, because the headrest 2 remains where it is even if an external force is removed when the headrest 2 is locked by the falloff preventing device 9 in an attempt to pull the headrest 2 upwards.

Figure 6:
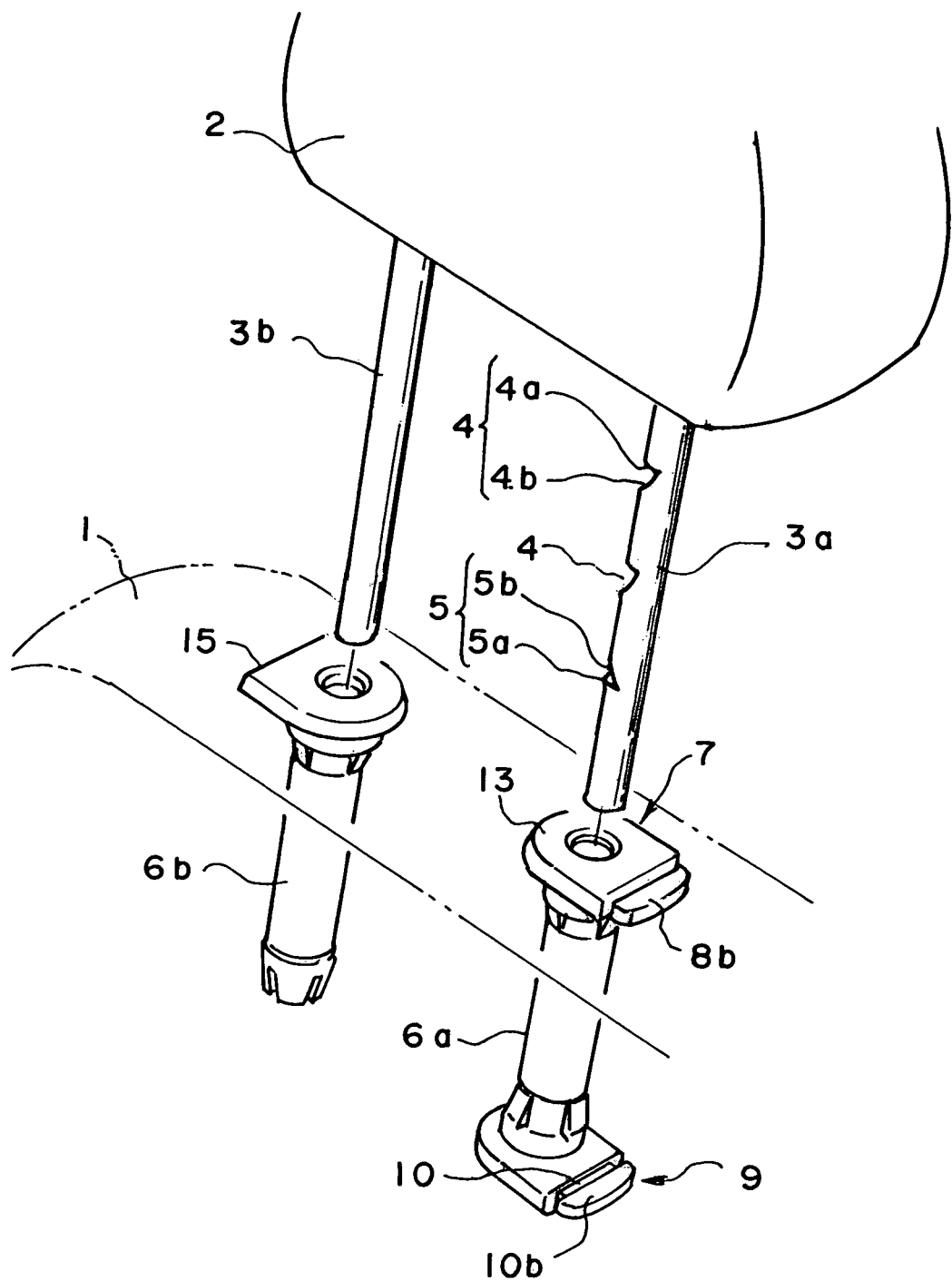
FIG. 6 is an exploded perspective view of a main part according to a second embodiment of the present invention.
Figure 7:
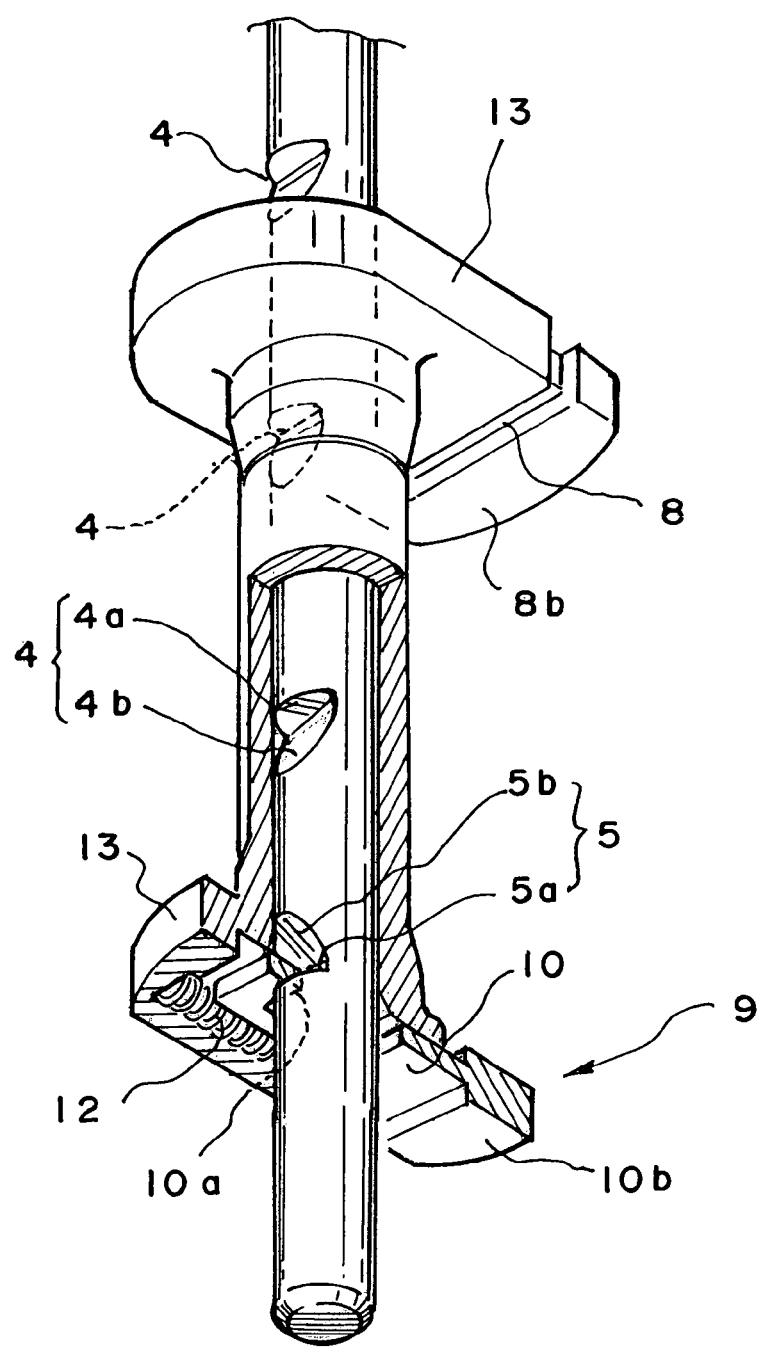
FIG. 7 is a partially broken perspective view of a falloff preventing device according to the second embodiment of the present invention as viewed from its bottom face side.
Figure 8:
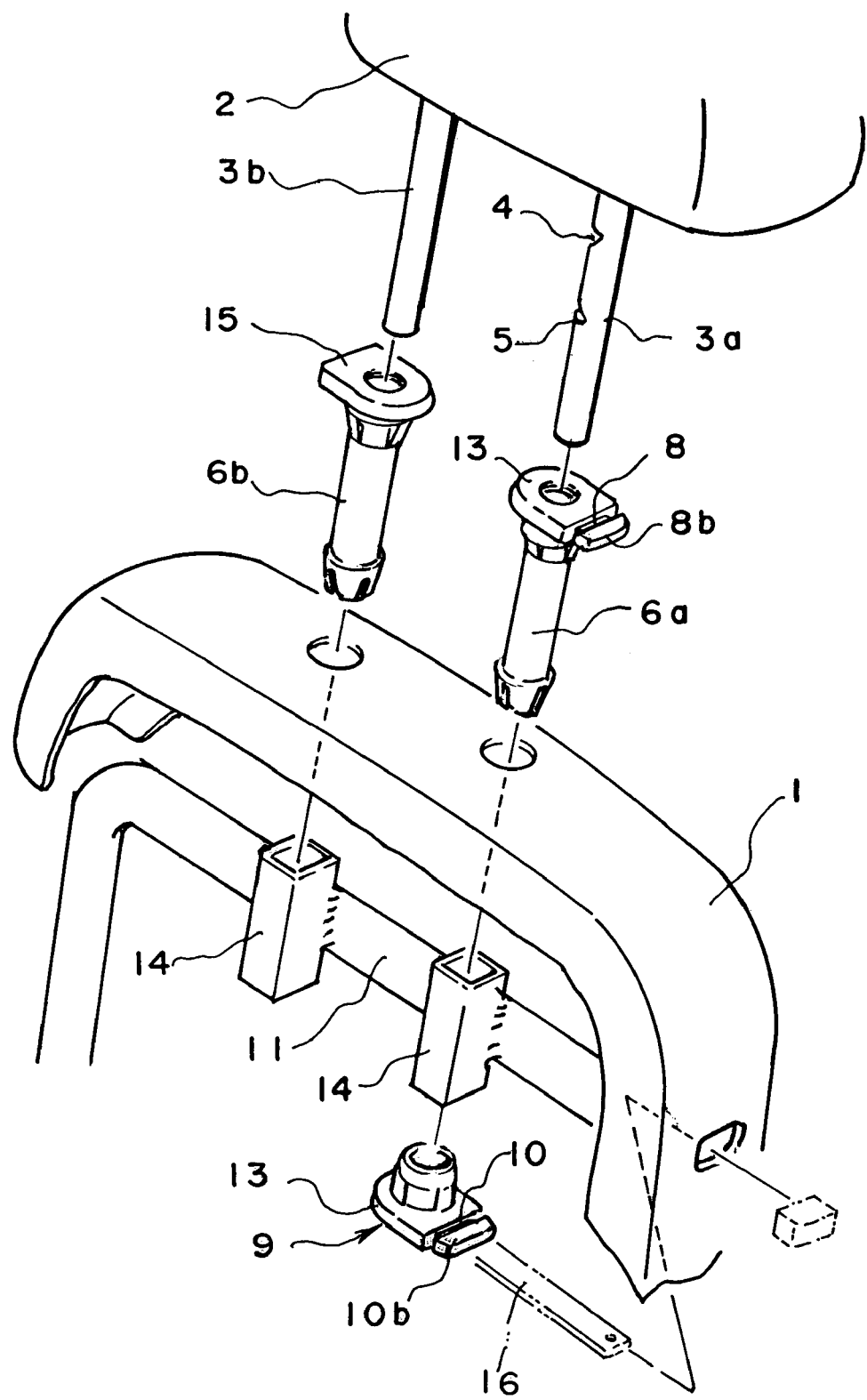
FIG. 8 is an exploded perspective view showing the second embodiment of the present invention.

FIGS. 6 to 8 show a second embodiment of the present invention. FIG. 6 is an exploded perspective view of a main part thereof. FIG. 7 is a partially broken perspective view of a falloff preventing device thereof as viewed from its bottom face side. FIG. 8 is an exploded perspective view thereof. In this embodiment, while the height adjusting mechanism 7 is provided at the upper end of the headrest bush 6a, the falloff preventing device 9 is provided at the lower end of the headrest bush 6a. The headrest stay 3a, which is inserted in the headrest bush 6a, is provided with the height adjusting notches 4 and the falloff preventing notch 5. Because the second embodiment is identical with the first embodiment in other respects, like components are denoted by like reference symbols.

The headrest 2 is supported by inserting the headrest stays 3a and 3b into the tubular headrest bushes 6a and 6b, respectively. The headrest stays 3a and 3b are attached to the headrest 2 to support it. The headrest bushes 6a and 6b are securely installed on the side of the seat back 1. As shown in FIG. 8, the headrest bushes 6a and 6b are fixed to the seat back frame 11 of the seat back 1. More specifically, the headrest bushes 6a and 6b are fixed by being inserted into the tubular attachment members 14, which are firmly fixed to the seat back frame 11.

As shown in FIG. 7, while the height adjusting mechanism 7 is provided at the upper end of the headrest bush 6a, the falloff preventing device 9 is provided at the lower end of the headrest bush 6a, that is, inside the seat back 1. The headrest stay 3a inserted in the headrest bush 6a is provided with the height adjusting notches 4 that are arranged at intervals of a predetermined distance. The falloff preventing notch 5 is provided in a lowermost portion of the headrest stay 3a. Each of the height adjusting notches 4 is formed of the horizontal face 4a that extends toward the center of the headrest stay 3a and the inclined face 4b that extends downwards from the deepest portion of the horizontal face 4a while gradually increasing in distance from the center of the headrest stay 3a. The falloff preventing notch 5 is formed of the horizontal face 5a that extends toward the center of the headrest stay 3a and the inclined face 5b that extends upwards from the deepest portion of the horizontal face 5a while gradually increasing in distance from the center of the headrest stay 3a.

The headrest stay 3b is inserted in its free state in the headrest bush 6b. The upper end of the headrest bush 6b is located in the upper end portion of the seat back 1, and is provided with the case 15.

The height adjusting mechanism 7 and the falloff preventing device 9 are constructed in the same manner as in the aforementioned first embodiment. In the height adjusting mechanism 7, therefore, when the headrest 2 is pulled upwards (pulled outwards), the portion 8a of the lock plate 8 abutting on the headrest stay 3a is released from the height adjusting notch 4 against a resilient force (spring force) of the spring 12 owing to an operation of the inclined face 4b of the notch 4. As a result, the headrest stay 3a can move upwards and the height of the headrest 2 can be adjusted. In moving downwards, face 4a of the notch 4 is locked by being engaged with the lock plate 8. In contrast, when the headrest 2 is pressed downwards, the lock plate 8 remains engaged with the horizontal face 4a of the notch 4 without being released therefrom. Thus, the operating portion 8b of the lock plate 8 is pressed to unlock the headrest stay 3a. As a result, the headrest stay 3a can move downwards and the downward movement of the headrest 2 can be adjusted. Because the height adjusting mechanism 7 is located in the upper end portion of the seat back 1, the operating portion 8b can be easily operated.

In the falloff preventing device 9, when the headrest stay 3a of the headrest 2 moves upwards and the falloff preventing notch 5 reaches the lock plate 10, the lock plate 10 is engaged with the horizontal face 5a of the notch 5, so that the headrest stay 3a is locked. Thus, the headrest 2 cannot be pulled any further upwards and is prevented from falling off. In order for the headrest stay 3a to be pulled further upwards and drawn out, the operating portion 10b of the lock plate 10 must be pressed to unlock the headrest stay 3a. Because the falloff preventing device 9 is provided inside the seat back 1, the headrest stay 3a cannot be easily unlocked. Therefore, the headrest 2 can be prevented from being removed (separated) from the seat back 1 easily or deliberately. The second embodiment is identical with the aforementioned first embodiment in other respects.

The aforementioned embodiments are not intended to limit the present invention and can be subjected to various modifications insofar as they do not depart from the gist of the present invention. For instance, the falloff preventing notch may assume other shapes. Further, as shown in FIGS. 5 and 8, an unlocking operation stick 16 of the falloff preventing device 9 may be extended out from a lateral face of the seat back 1 to operate the lock member (lock plate) 10. In this case as well, since the operating portion of the operation stick 16 is spaced apart from the headrest 2, the headrest 2 cannot be unlocked and removed (separated) unless both hands and other means are used or multiple persons are involved. Therefore, the headrest 2 can be prevented from being drawn out easily or deliberately. Further, the locking and unlocking mechanisms of the height adjusting mechanism and the falloff preventing device can employ conventionally known means. For instance, the headrest stays may not penetrate the lock member (lock plate).

The present invention is applicable not only to automobiles but also to other vehicles.

While specific embodiments of the invention have been shown and described in detail to illustrate the application of the principles of the invention, it will be understood that the invention may be embodied otherwise without departing from such principles.

What is claimed is:

1. An automobile headrest comprising:
a first headrest stay and a second headrest stay that support the headrest;
a first headrest bush and a second headrest bush in which the first headrest stay and the second headrest stay are inserted and supported respectively;
a height adjusting mechanism that is attached to the first headrest bush at a position adapted to correspond to an upper end portion of a seat back; and
a headrest removal prevention device that is built in the second headrest bush at a position adapted to be inside the seat back and includes a locking mechanism for preventing the headrest from being removed and an unlocking mechanism for unlocking the headrest,
wherein the first headrest stay is provided with a height adjusting notch,
wherein the second headrest stay is provided with a removal prevention notch,
wherein the height adjusting mechanism is provided with a lock member capable of reciprocating and adapted to abut on the first headrest stay inserted in the first headrest bush due to a resilient force of a spring, and includes a locking mechanism for holding the headrest at a predetermined height through engagement of the lock member with the height adjusting notch of the first headrest stay and an unlocking mechanism for disengaging the lock member from the height adjusting notch through an operation of the lock member against the resilient force of the spring,
wherein the headrest removal prevention device is provided with a lock member capable of reciprocating and adapted to abut on the second headrest stay inserted in the second headrest bush due to a resilient force of a spring, wherein the locking mechanism of the headrest removal prevention device prevents the headrest from being removed through engagement of the lock member with the removal prevention notch of the second headrest stay, wherein the unlocking mechanism of the headrest removal prevention device disengages the lock member from the removal prevention notch through an operation of the lock member against the resilient force of the spring, and wherein the height adjusting mechanism and the removal prevention device are formed of the same component and are interchangeable.

2. An automobile headrest comprising:

a headrest stay that supports the headrest;

a headrest bush into which the headrest stay is inserted to support the headrest;

a height adjusting mechanism that is attached to the headrest bush at a position adapted to correspond to an upper end portion of a seat back; and a headrest removal prevention device that is built in the headrest bush provided with the height adjusting mechanism at a position adapted to be inside the seat back and includes a locking mechanism for preventing the headrest from being removed and an unlocking mechanism, wherein the height adjusting mechanism of the headrest has a height adjusting notch formed in the headrest stay, wherein the headrest removal prevention device has a removal prevention notch formed in the headrest stay, wherein the height adjusting mechanism is provided with a lock member capable of reciprocating and adapted to abut on the headrest stay inserted in the headrest bush due to a resilient force of a spring, and includes a locking mechanism for holding the headrest at a predetermined height through engagement of the lock member with the height adjusting notch of the headrest stay and an unlocking mechanism for disengaging the lock member from the height adjusting notch through an operation of the lock member against the resilient force of the spring, wherein the headrest removal prevention device is provided with a lock member capable of reciprocating and adapted to abut on the headrest stay inserted in the headrest bush due to a resilient force of the spring, wherein the locking mechanism of the headrest removal prevention device prevents the headrest from being removed through engagement of the lock member with the removal prevention notch of the headrest stay, wherein the unlocking mechanism of the headrest removal prevention device disengages the lock member from the removal prevention notch through an operation of the lock member against the resilient force of the spring, and wherein the height adjusting mechanism and the headrest removal prevention device are formed of the same component and are interchangeable.

3. An automobile headrest comprising:

a headrest stay for supporting the headrest, said headrest stay having a height adjusting notch and a removal prevention notch;

a headrest bush, said headrest stay being inserted into said headrest stay;

a height adjusting means for adjusting the height of the headrest, said height adjusting means being connected to said headrest bush at a position adapted to correspond to an upper end portion of a seat back, said height adjusting means engaging and disengaging said height adjusting notch, said height adjusting means holding the headrest at a predetermined height when said height adjusting means engages said height adjusting notch; and a headrest removal prevention means for engaging and disengaging said removal prevention notch, wherein said headrest removal prevention means is substantially identical to said height adjusting means, said headrest removal prevention means being connected to said headrest bush at a position adapted to be inside the seat back, said headrest removal prevention means preventing the removal of the headrest when said headrest removal prevention engages said removal prevention notch.

4. An automobile headrest comprising:

a first headrest stay and a second headrest stay that support the headrest;

a first headrest bush and a second headrest bush in which the first headrest stay and the second headrest stay are inserted and supported respectively;

a height adjusting mechanism that is attached to the first headrest bush at a position adapted to correspond to an upper end portion of a seat back; and a headrest removal prevention device that is built in the second headrest bush at a position adapted to be inside the seat back and includes a locking mechanism for preventing the headrest from being removed and an unlocking mechanism for unlocking the headrest, wherein the first headrest stay is provided with a height adjusting notch, wherein the second headrest stay is provided with a removal prevention notch, wherein the height adjusting mechanism is provided with a lock member capable of reciprocating and adapted to abut on the first headrest stay inserted in the first headrest bush due to a resilient force of a spring, and includes a locking mechanism for holding the headrest at a predetermined height through engagement of the lock member with the height adjusting notch of the first headrest stay and an unlocking mechanism for disengaging the lock member from the height adjusting notch through an operation of the lock member against the resilient force of the spring, wherein the headrest removal prevention device is provided with a lock member capable of reciprocating and adapted to abut on the second headrest stay inserted in the second headrest bush due to a resilient force of a spring, wherein the locking mechanism of the headrest removal prevention device prevents the headrest from being removed through engagement of the lock member with the removal prevention notch of the second headrest stay, wherein the unlocking mechanism of the headrest removal prevention device disengages the lock member from the removal prevention notch through an operation of the lock member against the resilient force of the spring, and wherein the lock member, locking mechanism and unlocking mechanism of the height adjusting mechanism are respectively substantially identical to the lock member, locking mechanism and unlocking mechanism of the removal prevention device, each being interchangeable.

* * * * *